United States Patent [19]
Ardon

[11] Patent Number: 5,784,449
[45] Date of Patent: Jul. 21, 1998

[54] TELECOMMUNICATIONS NETWORK FOR SERVING USERS FROM TWO SWITCHES

[75] Inventor: Menachem Tsur Ardon, Naperville, Ill.

[73] Assignee: Lucent Technologies Inc., Murray Hill, N.J.

[21] Appl. No.: 567,760

[22] Filed: Dec. 5, 1995

[51] Int. Cl.[6] .............................. H04M 7/00; H04M 3/22
[52] U.S. Cl. .................. 379/230; 379/207; 379/221; 379/279; 379/334
[58] Field of Search .............................. 379/201, 207, 379/219, 220, 221, 112, 113, 114, 115, 242, 243, 244, 245, 246, 279, 230, 399, 334; 370/351, 401, 395, 396, 352

[56] References Cited

U.S. PATENT DOCUMENTS

| | | | |
|---|---|---|---|
| 5,450,482 | 9/1995 | Chen et al. | 379/230 |
| 5,541,917 | 7/1996 | Farris | 379/220 |
| 5,544,164 | 8/1996 | Baran | 370/352 |
| 5,550,912 | 8/1996 | Akinpelu et al. | 379/201 |
| 5,559,877 | 9/1996 | Ash et al. | 379/221 |
| 5,563,939 | 10/1996 | La Porta et al. | 379/201 |
| 5,574,783 | 11/1996 | Dunn | 379/230 |
| 5,592,477 | 1/1997 | Farris et al. | 370/396 |
| 5,606,602 | 2/1997 | Johnson et al. | 379/112 |
| 5,610,910 | 3/1997 | Focsaneanu et al. | 370/351 |

*Primary Examiner*—Ahmad F. Matar
*Assistant Examiner*—Scott Wolinsky

[57] ABSTRACT

A method and apparatus for serving selected lines and trunks from two or more switches. The selected line and trunks are connected to peripheral units each served by two or more switches. The switches each maintain translation information and the supervisory states of the selected lines and trunks. Advantageously, at low cost, the selected lines and trunks can be provided with service even when one of the switches is out of service.

5 Claims, 2 Drawing Sheets

TELECOMMUNICATIONS NETWORK FOR SERVING USERS FROM TWO SWITCHES

TECHNICAL FIELD

This invention relates to methods and apparatus for improving the reliability of service offered to telecommunications users.

PROBLEM

A trend in modern telecommunications switching systems is to have ever increasing reliance on such telecommunications switching systems. The potential losses arising from even a few minutes of down time of a major exchange, for example, New York's Wall Street area, is probably millions of dollars.

A problem of the prior art is that no economically satisfactory solution has been found to provide switching systems with backup facilities in an economic manner.

Additionally, cable television providers are trying to get into the market for supplying telephone service access. Voice channels for many television/telephone customers i.e., telephone customers served via a television cable, can be transmitted over a television cable and the connected customer can receive and transmit voice signals over an individually selected channel on that cable. Such cable voice signals may have to be transmitted to two or more local exchange carriers. A problem of the prior art is that there is no economical arrangement for providing access to two or more carriers from a single peripheral unit terminating such a television cable.

SOLUTION

The above problem is solved and an advance is made over the teachings of the prior art in accordance with this invention wherein peripheral units serving lines requiring high reliability service are connected to two or more switching systems (switches) and wherein each of the connected switches maintains or has ready access to a record of the supervisory state of each line connected to such a peripheral unit. For incoming calls to either of the switches connected to that peripheral unit, the calls can be completed from the receiving switch without encountering contention problems because that switch knows whether the called line is busy or idle; the receiving switch informs other switch(es) in order to ensure that the other switch(es) do not complete other calls to the same line while the line is busy. For outgoing traffic, a call from one of the lines connected to such a peripheral unit may be routed via one of the connected switches and the other switch(es) are informed of the change in the supervisory state of the line. In one preferred embodiment of the invention, each of the switches maintains translation data from that line in order to be able to handle originating and terminating calls for that line. Advantageously, if either of the switches fails, traffic can be originated or completed via the other switch.

In one preferred embodiment of the invention, one of the peripheral units is a subscriber loop carrier (SLC) system, such as the SLC 96 manufactured by AT&T Network Systems, which has a plurality of output links, each carrying a multiplexed signal; to implement the invention, different ones of that plurality are terminated on different ones of the connected switches. Other units which have a plurality of multiplexed outputs are remote line units and remote switching modules, both manufactured by AT&T Network Systems for use with 5ESS® switches, and equivalents of such systems available from other manufacturers.

In accordance with one feature of the invention, if a call originates on one of the switches serving a multiple access line, and the call terminates on another switch accessible to the originating line, then the peripheral unit is requested to switch the call to a channel terminating on the same switch as the terminating switch of the called line, and the originating switch requests the terminating switch to handle the call.

In accordance with another feature of the invention, if a call comes in to one switch for serving the terminating line, and the terminating line is busy but is served by another switch, then a check is made whether the terminating line has call waiting service. (If translations information is retained in both switches, this is straightforward.) If the terminating line has call waiting, the call is redirected to the other switch; the most straightforward way of performing this redirection, is via an ordinary trunk connection between the two switches. Advantageously, the switch which is serving the call for the terminating line is connected to the incoming call so that this switch can then perform the normal call waiting functions.

In accordance with one preferred embodiment a busy test is made as follows: One of the switches is designated as a home switch for a line. If the line is busy in the records of the testing switch then the line is treated as being busy. If the line is available in the status records of the terminating switch, then the line is considered available if the terminating switch is the home switch and is considered available if the terminating switch is not the home switch but a message from the terminating switch indicating a change of status to busy is acknowledged by the home switch. In the absence of such an acknowledgment, the line is considered busy, and the status of the line is changed to unavailable; in fact, a message from the home switch either has arrived before an acknowledgement is expected or will arrive shortly thereafter. Advantageously, if terminating calls are normally routed through the home switch, then the busy test is straightforward most of the time. If it is desired to route much of the traffic for that line to the other switch, then the penalty for a more complex busy test is still small. In an alternate embodiment, each line has a home switch. This switch is updated of any changes if supervision takes place. This switch is then queried to determine the true supervisory state.

In accordance with one preferred embodiment, a television cable for carrying both common television signals and individual voice signals to a plurality of television/telephone customers has its voice channels terminated on a dual homing peripheral unit. This unit is connected to two or more switches, ones of which switches may belong to different local exchange carriers. Advantageously, a single peripheral unit can terminate a single television cable to a plurality of switches. For this case, customers on the cable can change their preferred carrier without requiring a cross connection change by causing memory changes to be made in the per customer memory of the peripheral unit and switch.

DETAILED DESCRIPTION

Figure 1:
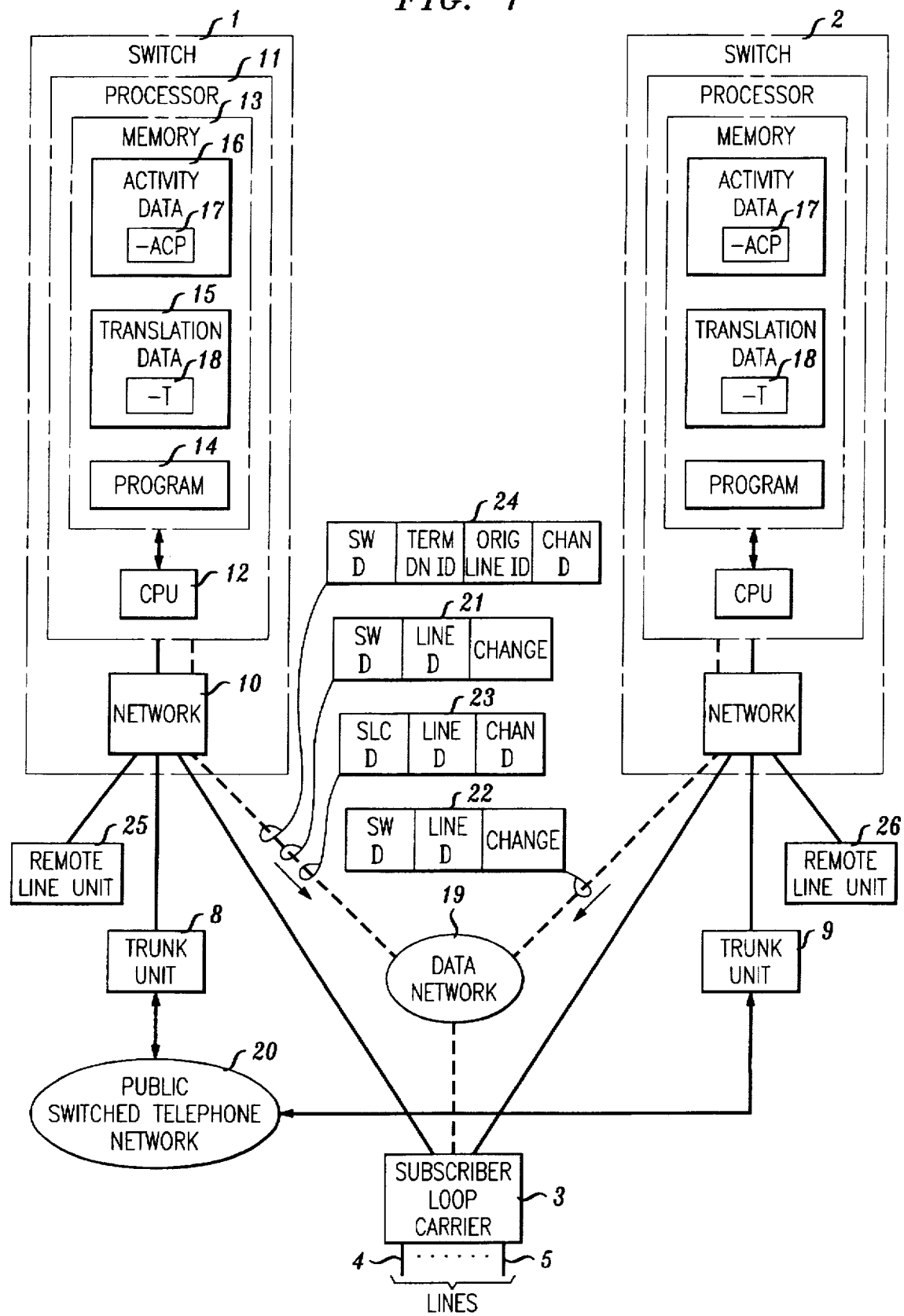
FIG. 1 is a block diagram illustrating the apparatus and messages used for implementing a preferred embodiment of applicant's invention.

FIG. 1 is a block diagram illustrating the operation of applicant's invention. In the exemplary embodiment, two switches, 1 and 2 are each connected by a set of links to outputs of subscriber loop carrier 3 carrying voice channels for input lines 4, . . . , 5. The lines 4, . . . , 5 are lines which require especially reliable service and therefore are arranged to be dual-homed, i.e., to be served by two switches. Line units such as remote line units 25 and 26 are connected each to only one of the two switches, respectively switches 1 and 2. A data network 19, which may be a distributed network including direct links between the switches and/or the subscriber loop carrier 3, is shown for interconnecting subscriber loop carrier (SLC) 3, switch 1 and switch 2. While the specific example selected herein for serving dual-homed lines is a remote unit (the SLC), local peripheral units, such as line units, can also save dual-homed lines. Switch 1 and switch 2 each include a switching network 10 and a processor 11. Included in the processor is a central processing unit 12 and a memory 13. The memory includes a control program 14, translation data 15 comprising data for lines and trunks served by the switch such as data block 18 which contains translation data for line 4 as well as routing data for routing calls processed by the switch and includes activity data 16 which includes the supervisory state 17 (busy or idle) of the lines such as line 4 (L4-A(ct.) and trunks served by the switch. In a departure from the prior art, the translation data and the activity data of line 4, . . . . 5 are maintained in both switches 1 and 2. While an individual call origination or termination for one of these lines is served from only a single one of the switches, both switches maintain this data so that each switch can handle a new request for a call termination to one of these lines. Messages 21 and 22 are used by switch 1 and switch 2 respectively, to inform the other switch of a change of supervisory state for one of the lines such as lines 4, . . . . 5 which are dual homed.

While the unit illustrating dual homing unit is SLC 3 in this example, the basic dual homing arrangement can also serve wireless stations or connections to a private branch exchange (PBX). More broadly, such a peripheral unit serves customer terminals.

Further, a peripheral unit can be connected to channels received from cables to television/telephone customers for providing TV and telephone signals. The term cable as used herein includes fiber optic cables as well as coaxial cables. The peripheral unit converts the telephone voice channels into digital channels for connection to a switching system. If the peripheral units are dual homing units, such as SLC 3, it is possible for the caller to select a preferred carrier for all outgoing calls, for a fraction of outgoing calls, or on a per call basis. For this type of application, if the only option is to select carrier, it is not necessary to provide the translation and supervisory state data for such customers in both switches. The digital channels can be asynchronous transfer mode (ATM) channels wherein the header information can specify a selection of a particular, hence, a particular switch.

If a line such as line 4 originates a call via switch 1, which call is terminated on a line connected, for example, to remote line unit 26 which is connected to switch 2, the call can be redirected so that it is served entirely by switch 2. (Note that switch 1 cannot serve this call alone because switch 1 does not serve remote line unit 26.) After switch 1 has received an origination, and has received a dialed number from, for example, line 4, it can recognize the call terminates on switch 2. In order to handle the call more efficiently switch 1 sends a message 23 via data network 19 to SLC 3 to switch line 4 from one of the channels connected to switch 1 to one of the channels connected to switch 2. It can then send a message 24 to switch 2 providing the identification of the originating line the terminating directory number and the channel to SLC 3 on which line 4 will now be connected to switch 2. Switch 2 then has the information necessary to complete the call.

Figure 2:
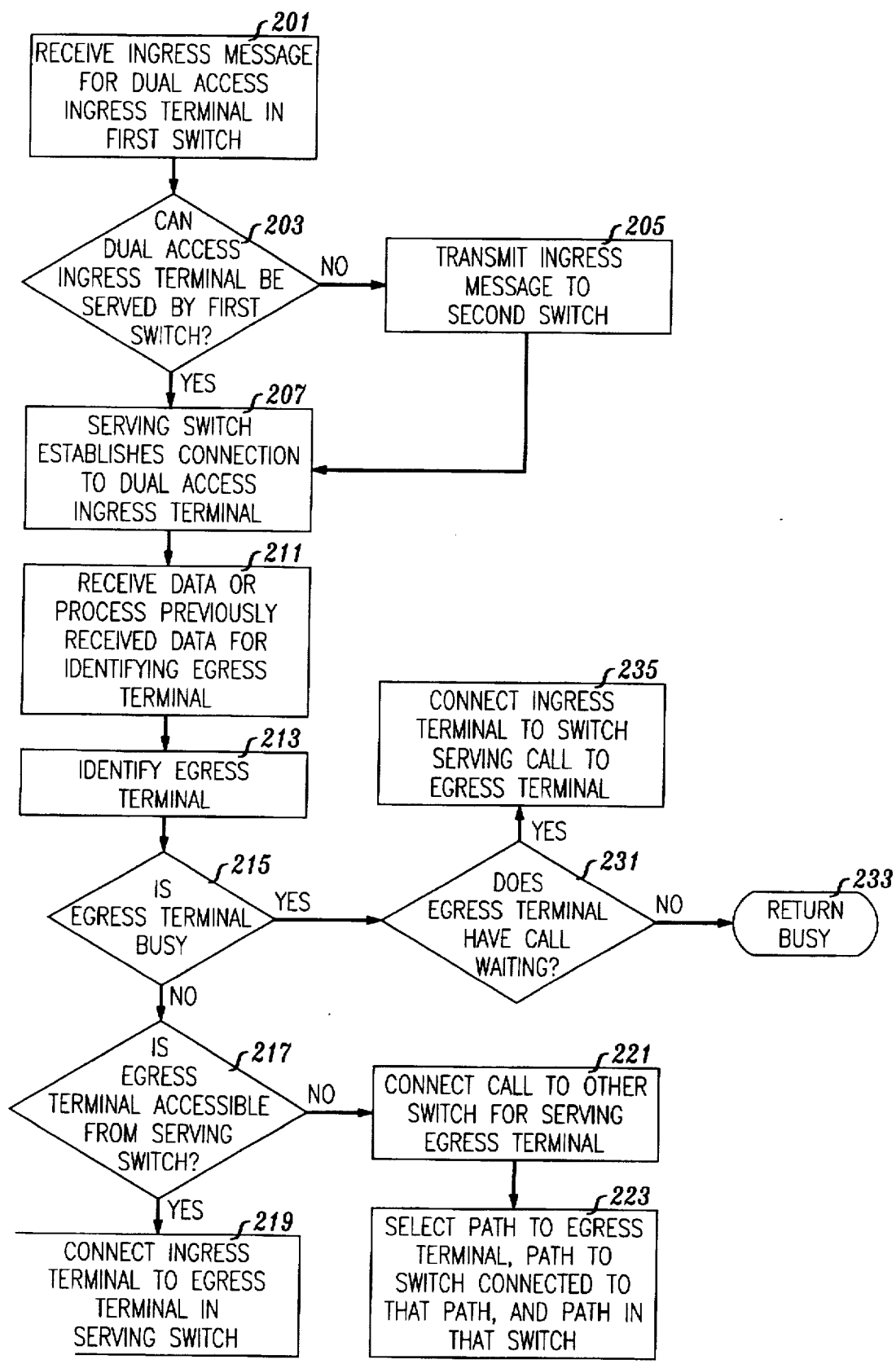
FIG. 2 is a flow diagram illustrating the method of applicant's invention.

FIG. 2 is a flow diagram of actions performed to serve calls in the system according to applicant's invention. For the sake of clarity all incoming terminals, either originating lines or incoming trunks, are termed ingress terminals; all outgoing terminals, either terminating lines or outgoing trunks, are designated egress terminals. An ingress message is received for a dual access ingress terminal in a first switch (action block 201). This ingress message may be a common channel signaling (SS7) message for an incoming trunk; it may be ISDN (Integrated Services Digital Network) initial message from an ISDN line originating a call; it may be an origination message from a subscriber loop carrier system such as unit 3 announcing that one of the lines 4, . . . . 5 is originating a call; or it may be a seizure from a dual access trunk that is not a an SS7 trunk but is a trunk whose signals are carried in band, (for example, a multi-frequency (MF) trunk). Note that trunks as well as lines can be dual homing in order to provide a higher degree of reliability for the network. Test 203 is used to determine whether the dual access ingress terminal can be served a first switch. A terminal cannot be served by a switch if all channels to that switch are busy or if out of service. A negative result of test 203 might be encountered for example if the messages from an SLC 3 are normally routed to switch 1 but that a particular one of the lines 4, . . . . 5 is normally served by switch 2 or because no paths are available from switch 1. If the result of test 203 is negative, then the ingress message is transmitted to the second switch (action block 205). Thereafter, whichever switch was selected in test 203 is referred to as the serving switch. The serving switch then establishes a connection to the dual access ingress terminal (action block 207). Thereafter, the actions performed by action block 211 and succeeding action blocks tests are common and are considered to be performed by the serving switch.

If the result of test 203 is positive, then the dual access ingress terminal is connected to the first switch (action block 209) which now becomes the serving switch (Action Block 207). The serving switch receives data for identifying the egress terminal or processes previously received data (for example, from an initial address message of an ISDN telephone or from an initial SS7 message). The data received for identifying the egress terminal, if not in an initial message, is provided by the caller or the public switched telephone network as a series of dialed digits or transmitted digits. After the addressing information has been received, the egress terminal is identified (action block 213). In this group of switches 1, . . . . 2, it is desirable to group all outgoing or two-way trunks having a common destination and common characteristics into a single list of trunks. The hunting of a trunk within such a list whose trunks are spread over a plurality of switches is normally assigned to one of the switches which maintains a record of the status (busy, available, out-of-service) of each of the trunks in the list; the hunting switch selects a trunk and informs the serving switch of the selection. The selection may be biased toward completion of calls within the serving switch by selecting an available trunk accessible to the serving switch via either a single access or a multiple access peripheral unit. These remarks also apply to lines of a multi-line hunt group. If the egress terminal is directly served by the serving switch the call can be directly completed. If the egress terminal is served only by the other switch of the pair, the office code translation in the serving switch will so indicate and the call can be switched to that other switch in the peripheral unit.

If the egress terminal is a trunk of the other switch of the pair, the translation information in the serving switch will indicate that the call should be routed to that other switch. Next, if the egress terminal is a line, then test 215 is used to determine whether the egress terminal is busy. If the egress terminal is a single access line served by the serving switch, the busy test is straightforward. If the egress terminal is a single access line served by the other switch, (test 217, negative result), then the call is routed to that other switch over a trunk; from the point of view of the serving switch, no busy test is required. If the egress terminal is a dual access terminal, then the supervisory state for that line is maintained in both switches. If that supervisory state indicates busy, the line can be treated as being busy. If the supervisory state is idle, then if the serving switch is the home switch for the egress line the idle status can be accepted. If the call record indicates that the egress line is idle, and the serving switch is not the home switch, then the serving switch sends a message to the home switch indicating that the line is being seized. If the serving switch then receives an acknowledgement, then the line can be treated as having been idle. If the serving switch does not receive an acknowledgement, or receives a message indicating that the line has been made busy, prior to the receipt of the acknowledgment message, then the serving switch must treat the lines as being busy.

If the result of the busy test is that the egress terminal is treated as not being busy or if the egress terminal is a trunk, then test 217 is used to determine whether the egress terminal is accessible from the serving switch. An example in which the egress terminal may not be accessible from the serving switch is a dual access line and all channels from the serving switch to the peripheral units (for example subscriber loop carrier 3) are unavailable. In that case the call is connected to the other switch for serving the egress terminal (action block 221) and thereafter the call is processed in the conventional fashion (action block 223). The connection is made over an interoffice trunk in the same way as other call connections between the two switches are made. If the result of test 217 is that the egress terminal is accessible from the serving switch, then the ingress terminal is connected to the egress terminal in the serving switch in the conventional manner (Action Block 219).

If the result of the busy test 215 is that the terminating line is busy, then test 231 is included to determine whether the egress terminal has call waiting. If not, then a busy signal is returned on the call, (end block 233), and further processing of the call is terminated. If the egress terminal has call waiting. Then the call is served by whichever switch is serving the call in progress to the egress terminal (action block 235). If this is the serving switch, then call waiting processing proceeds in the normal fashion. If this is not the serving switch, then the call is routed from the serving switch to the other switch over interoffice call connections facilities and upon arrival at the other switch the normal call waiting situation is encountered for that call.

The invention claimed is:

1. A telecommunications network comprising:

two switching systems;

at least one peripheral unit connected to both switching systems for serving a plurality of terminals; and a data network for transmitting control messages between the two switching systems;

wherein all calls incoming to or originating in either of the two switching systems can be completed to any of said plurality of terminals served by said peripheral unit;

wherein all calls originated by any of a plurality of terminals served by said peripheral unit can be served by either of the two switching systems;

wherein identical translation data for terminals served by said peripheral unit is maintained in each of said switching systems; and wherein changes in the supervisory state of lines served by said peripheral unit and either of said switching systems are transmitted to the other of said switching systems.

2. A telecommunications network comprising:

two switching systems;

at least one SLC (Subscriber Loop Carrier) system connected to both switching systems for serving a plurality of terminals; and a data network for transmitting control messages between the two switching systems;

wherein all calls incoming to or originating in either of the two switching systems can be completed to any of said plurality of terminals served by said SLC system;

wherein all calls originated by any of a plurality of terminals served by said SLC system can be served by either of the two switching systems;

wherein identical translation data for terminals served by said SLC system is maintained in each of said switching systems; and wherein changes in the supervisory state of lines by said SLC system and either of said switching systems are transmitted to the other of said switching systems.

3. In a telecommunications network comprising two switches, a method of receiving an incoming or originating call destined for a line of a select group of lines, comprising the steps of:

connecting said select group of lines to peripheral units served by both switches;

maintaining identical translation data for said line of said select group of lines in both switches;

maintaining a supervisory state for lines of said select group of lines in both switches;

responsive to receiving said incoming or originating call in a first of said two switches, testing whether said line is available;

said line is available, seizing said line via said first switch; and transmitting a message to the second of said two switches to update the supervisory state for said line in said second switch.

4. The method of claim 3 further comprising the step of:

if said line is busy, has call waiting, and is on a call served by the second of said switches, extending said incoming or originating call to the second switch.

5. The method of claim 3 further comprising the steps of:

detecting an origination for an originating call in the first switch;

receiving data for identifying a destination for said originating call;

determining that said destination is served by the second switch; and rerouting the originating call from a peripheral unit serving the origination to the second switch.

\* \* \* \* \*